(12) United States Patent
Kimura

(10) Patent No.: US 6,677,972 B2
(45) Date of Patent: Jan. 13, 2004

(54) SCANNING OPTICAL APPARATUS AND IMAGE FORMING APPARATUS USING THE SAME

(75) Inventor: Kazumi Kimura, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/917,742

(22) Filed: Jul. 31, 2001

(65) Prior Publication Data

US 2002/0036689 A1 Mar. 28, 2002

(30) Foreign Application Priority Data

Aug. 1, 2000 (JP) .......................... 2000-233030

(51) Int. Cl.⁷ .............................. B41J 15/14; B41J 27/00
(52) U.S. Cl. ........................................ 347/244; 347/259
(58) Field of Search ................................ 347/241, 244, 347/255, 258; 847/241, 243, 244, 256, 258, 259; 359/205, 206, 207

(56) References Cited

U.S. PATENT DOCUMENTS 4,379,612 A * 4/1983 Matsuoka et al. .......... 359/218
5,838,480 A * 11/1998 McIntyre et al. ........... 359/205
5,966,232 A   10/1999 Kimura et al. .............. 359/205
5,986,791 A * 11/1999 Suzuki et al. ............... 359/207
6,038,053 A    3/2000 Kato ........................... 359/205
6,046,835 A    4/2000 Yamawaki et al. ......... 359/205
6,108,115 A    8/2000 Kimura et al. .............. 359/205
6,201,626 B1 * 3/2001 Kamikubo ................... 359/205

FOREIGN PATENT DOCUMENTS

JP    11-2237384    8/1999

* cited by examiner

Primary Examiner—Hai Pham
(74) Attorney, Agent, or Firm—Fitzpatrick, Cella, Harper & Scinto

(57) ABSTRACT

A scanning optical apparatus includes incident optical system for causing at least one light beam emitted from a light source to be incident on a deflection device and image formation optical system including at least one refractive optical element and at least one diffraction optical element for imaging said at least one light beam reflected and deflected by the deflection device on a surface to be scanned. The diffraction optical element has at least one of an incident surface having a convex shape in a sub-scanning cross-section facing the deflection device and an exit surface having a convex shape in the sub-scanning cross-section facing the surface to be scanned.

8 Claims, 6 Drawing Sheets

SCANNING OPTICAL APPARATUS AND IMAGE FORMING APPARATUS USING THE SAME

BACKGROUND OF THE INVENTION

1. Field of the Invention

The present invention relates to a scanning optical apparatus and an image forming apparatus using the same. More particularly, the present invention relates to a device suitably used for an image forming apparatus, such as a laser beam printer or a digital copying machine having an electrophotographic process, in which at least one light beam emitted from a light source means is deflected by a deflection element and then optically scans a scanning surface through an image forming element having an fθ characteristic, thereby recording image information.

2. Related Background Art

In a conventional scanning optical apparatus used for a laser beam printer (LBP), a digital copying machine, or the like, the light beam optically modulated according to an image signal and emitted from a light source means is regularly deflected by a light deflector composed of a rotary polygon mirror (polygon mirror). The deflected light beam is converged to form a spot on a surface of a photosensitive recording medium (photosensitive drum) by a scanning optical element having an fθ characteristic, and optically scans the surface of the photosensitive drum to record an image thereon.

FIG. 5 is a schematic diagram that shows the main part of a conventional scanning optical apparatus of this type.

In this figure, diverging light beam emitted from a light source means 51 is converted into a substantially parallel light beam by a collimator lens 52, an aperture stop 53 limits the parallel light beam (quantity of light), and the limited parallel light beam strikes a cylinder lens (cylindrical lens) 54 having a predetermined refracting power only in the sub-scanning direction. The substantially parallel light beam striking the cylinder lens 54 is emitted as it is (in the state of substantially parallel rays) in a main scanning cross-section. In a sub-scanning cross-section, the light beam is converged to form a nearly linear image on a deflection surface (a reflection surface) 55a of a light deflector 55 composed of a rotary polygon mirror (polygon mirror).

The light beam reflected and deflected by the deflection surface 55a of the light deflector 55 is guided by an image formation means (fθ lens) 56 having an fθ characteristic to strike a photosensitive drum surface 58 to be scanned. By having the light deflector 55 rotate in the direction of an arrow A, the photosensitive drum surface 58 is optically scanned in the direction of an arrow B. In this manner, an image is recorded on the photosensitive drum surface 58 that is the recording medium.

In recent years, various scanning optical apparatuses (multi-beam scanning optical apparatuses) have been proposed in response to the increasing demand for high-speed and high-resolution LBPs. Each of such scanning optical apparatuses adopts a multi-beam laser that uses a plurality of laser light sources (light-emitting units) as its light source. With this construction, the scanning optical apparatus simultaneously scans surfaces of a plurality of recording media by irradiating the surfaces with a plurality of light beams.

In addition to high-speed and high-resolution image forming apparatuses having the electrophotographic process, various color image forming apparatuses that support high-speed color image formation have also been proposed. FIG. 6 is a schematic diagram that shows the main part of a tandem type color image forming apparatus that simultaneously uses a plurality of scanning optical apparatuses described above to record image information in various colors on the surfaces of a plurality of different photosensitive drums.

In the color image forming apparatus shown in this drawing, four scanning optical apparatuses (61, 62, 63, and 64) having the construction shown in FIG. 5 are arranged so as to respectively correspond to four colors: C (cyan), M (magenta), Y (yellow), and B (black). These scanning optical apparatuses record image signals on the surfaces of photosensitive drums (71, 72, 73, and 74) in parallel. With this construction, the color image forming apparatus prints color images at high speed.

One crucial aspect of the scanning optical apparatuses used for such a color image forming apparatus is the productivity and cost. Therefore, in usual cases, the scanning optical apparatuses are provided with image formation means (fθ lenses) that have been produced at low cost by molding of plastic.

In the scanning optical apparatus that uses a plastic lens, deviations in an image forming position are caused by changes in a focus position and chromatic aberration of magnification that are caused by various factors. Three major factors are given below.

Deviation in initial wavelength between a plurality of laser light sources

Deviation in wavelength caused by mode hopping of a semiconductor laser due to environmental variations Fluctuation in refractive index of the plastic lens due to environmental variations The deviations in the focus position result in the enlargements of a beam spot and degrade image quality. Deviations in the image forming position due to chromatic aberration of magnification cause magnification changes of recorded images. In particular, in a tandem type color image forming apparatus, the differences in magnification change among a plurality of scanning optical apparatuses cause registration deviations of each color (chromatic deviations), which results in degraded image quality.

A color image forming apparatus that solves this problem is proposed, for instance, in Japanese Patent Application Laid-open No. 11-223784. This color image forming apparatus corrects chromatic aberration of magnification and compensates for the temperature at a focus position using an image formation means constructed by combining a refractive optical element with a diffraction optical element.

The following is a description of an ordinary color image forming apparatus that includes an image formation means constructed by combining a refractive optical element with a diffraction optical element.

(a-1) The power of the diffraction optical element which is disposed at a far side with respect to the optical deflector needs to be increased to reduce the magnification (the sub-scanning magnification) of the image formation means in the sub-scanning direction as necessary. It is preferred to set the power ratio between the refractive optical element and the diffraction optical element at a desired ratio for an aberration correction purpose. It is difficult, however, to produce a high-power diffraction optical element because a grating pitch of its diffraction grating is reduced according to the increase in the power of the diffraction optical element. When the sub-scanning magnification is large, the scanning line deviates from a desired position due to various factors, such as the errors caused during the processing of deflection surfaces of a polygon mirror and the vibrations of the apparatus itself. This tends to cause jitter, which is a critical design factor because jitter causes registration deviations of each color (chromatic deviations) in a color image forming apparatus.

(a-2) When a scanning optical apparatus is manufactured and assembled using a plurality of optical elements (a refractive optical element and a diffraction optical element, in this case), if the refractive optical element and the diffraction optical element are eccentrically arranged due to manufacturing errors, the traveling path of a laser spot (so-called scanning line) is bent in the scanning optical apparatus. For instance, in the conventional case shown in FIG. 5, if a toric lens 56a is arranged at a position that is shifted 0.1 mm in a direction perpendicular to the plane of paper at normal mechanical accuracy, the bend degree of the scanning line becomes about 29 μm. In particular, in a tandem type color image forming apparatus, the differences in bend degree of scanning line among scanning optical apparatuses corresponding to respective colors cause registration deviations of each color (chromatic deviations). As a result, image quality is degraded.

SUMMARY OF THE INVENTION

An object of the present invention is therefore to provide a scanning optical apparatus where a diffraction optical element that is a component of an image formation means has an appropriate shape in the sub-scanning cross-section and the sub-scanning magnification of the image formation means is reduced, thereby improving the performance, such as jitter and image quality, of the scanning optical apparatus, and to provide an image forming apparatus using the scanning optical apparatus.

Another object of the present invention is further to provide a scanning optical apparatus where a refractive optical element is arranged at or near a front focus position of a diffraction optical element in the sub-scanning cross-section, thereby reducing the bend degree of a scanning line, and to provide an image forming apparatus using the scanning optical apparatus.

According to a first aspect of the present invention, there is provided a scanning optical apparatus comprising:

incident optical means for causing at least one light beam emitted from light source means to be incident on deflection means; and image formation means including at least one refractive optical element and at least one diffraction optical element for imaging the at least one light beam reflected and deflected by the deflection means on a surface to be scanned, in which the diffraction optical element has at least one of an incident surface having a convex shape in a sub-scanning cross-section facing the deflection means and an exit surface having a convex shape in the sub-scanning cross-section facing the surface to be scanned.

According to a second aspect of the present invention, in the first aspect of the invention, a diffraction grating is formed on one of an incident surface and an exit surface of each diffraction optical element.

According to a third aspect of the present invention, in the first aspect of the invention, the image formation means comprises a single refractive optical element and a single diffraction optical element and satisfies:

$$0.5 < |e2/s1|$$

where e2 is a distance between an exit surface of the refractive optical element on an optical axis and the incident surface of the diffraction optical element on the optical axis, and s1 is a distance between the incident surface of the diffraction optical element on the optical axis and a front focus position of the diffraction optical element in the sub-scanning cross-section.

According to a fourth aspect of the present invention, in the first aspect of the invention, the refractive optical element has a meniscus shape in a main scanning cross-section such that a concave surface faces the deflection means side.

According to a fifth aspect of the present invention, in the first aspect of the invention, a front focus position of the diffraction optical element in the sub-scanning cross-section is provided between a power arrangement in the sub-scanning cross-section of an on-axis refractive optical element and a power arrangement in the sub-scanning cross-section of an off-axis refractive optical element, in an optical axis direction.

According to a sixth aspect of the present invention, in the first aspect of the invention, the apparatus further comprises:

at least one of tilt adjusting means and shift adjusting means for adjusting a position of the diffraction optical element.

According to a seventh aspect of the present invention, there is provided an image forming apparatus comprising:

a scanning optical apparatus described in any one of the first to sixth aspects of the invention;

a photosensitive member arranged on the surface to be scanned;

a developing member for developing an electrostatic latent image formed on the photosensitive member by the light beam scanned by the scanning optical apparatus as a toner image;

a transfer member for transferring the developed toner image onto a material to be transferred;

a fixing member for fixing the transferred toner image on the material to be transferred; and a printer controller for converting code data inputted from an external device into an image signal and inputs the image signal into the scanning optical apparatus.

According to an eighth aspect of the present invention, there is provided an image forming apparatus comprising:

a plurality of scanning optical apparatuses described in any one of the first to sixth aspects of the invention;

in which a color image is formed by guiding a plurality of light beams emitted from the respective scanning optical apparatuses onto a plurality of corresponding image bearing member surfaces, respectively, and scanning the plurality of image bearing member surfaces with the plurality of light beams.

According to a ninth aspect of the present invention, there is provided a scanning optical apparatus comprising:

incident optical means for causing at least one light beam emitted from light source means to be incident on deflection means; and image formation means including at least one refractive optical element and at least one diffraction optical element for imaging the at least one light beam reflected and deflected by the deflection means on a surface to be scanned, in which the following condition is satisfied:

$$0.5 < |e2/s1| < 1.2$$

where e2 represents a distance between an exit surface of the refractive optical element on an optical axis and an incident surface of the diffraction optical element on the optical axis, and s1 represents a distance between the incident surface of the diffraction optical element on the optical axis and a front focus position of the diffraction optical element in a sub-scanning cross-section.

According to a tenth aspect of the present invention, in the ninth aspect of the invention, the diffraction optical element has at least one of an incident surface having a convex shape in a sub-scanning cross-section facing the deflection means and an exit surface having a convex shape in the sub-scanning cross-section facing the surface to be scanned.

According to an eleventh aspect of the present invention, in the ninth aspect of the invention, a diffraction grating is formed on one of the incident surface and the exit surface of the diffraction optical element.

According to a twelfth aspect of the present invention, in the ninth aspect of the invention, the refractive optical element has a meniscus shape in a main scanning cross-section such that a concave surface faces the deflection means.

According to a thirteenth aspect of the present invention, in the ninth aspect of the invention the front focus position of the diffraction optical element in the sub-scanning cross-section is provided between a power arrangement in the sub-scanning cross-section of an on-axis refractive optical element and a power arrangement in the sub-scanning cross-section of an off-axis refractive optical element, in an optical axis direction.

According to a fourteenth aspect of the present invention, in the ninth aspect of the invention, the apparatus further comprises:

at least one of tilt adjusting means and shift adjusting means for adjusting a position of the diffraction optical element.

According to a fifteenth aspect of the present invention, in the ninth aspect of the invention, the following condition is satisfied:

$$0.55<|e2/s1|<1.1$$

According to a sixteenth aspect of the present invention, there is provided an image forming apparatus comprising:

a scanning optical apparatus described in any one of the ninth to fifteenth aspects of the invention;

a photosensitive member arranged on the surface to be scanned;

a developing member for developing an electrostatic latent image formed on the photosensitive member by the light beam scanned by the scanning optical apparatus as a toner image;

a transfer member for transferring the developed toner image onto a material to be transferred;

a fixing member that fixes the transferred toner image on the material to be transferred; and a printer controller for converting code data inputted from an external device into an image signal and inputs the image signal into the scanning optical apparatus.

According to a seventeenth aspect of the present invention, there is provided an image forming apparatus comprising:

a plurality of scanning optical apparatuses described in any one of the ninth aspects to fifteenth aspects of the invention;

wherein a color image is formed by guiding a plurality of light beams emitted from the respective scanning optical apparatuses onto a plurality of corresponding image bearing member surfaces, respectively, and scanning the plurality of image bearing member surfaces with the plurality of light beams.

DETAILED DESCRIPTION OF THE PREFERRED EMBODIMENTS

Figure 1:
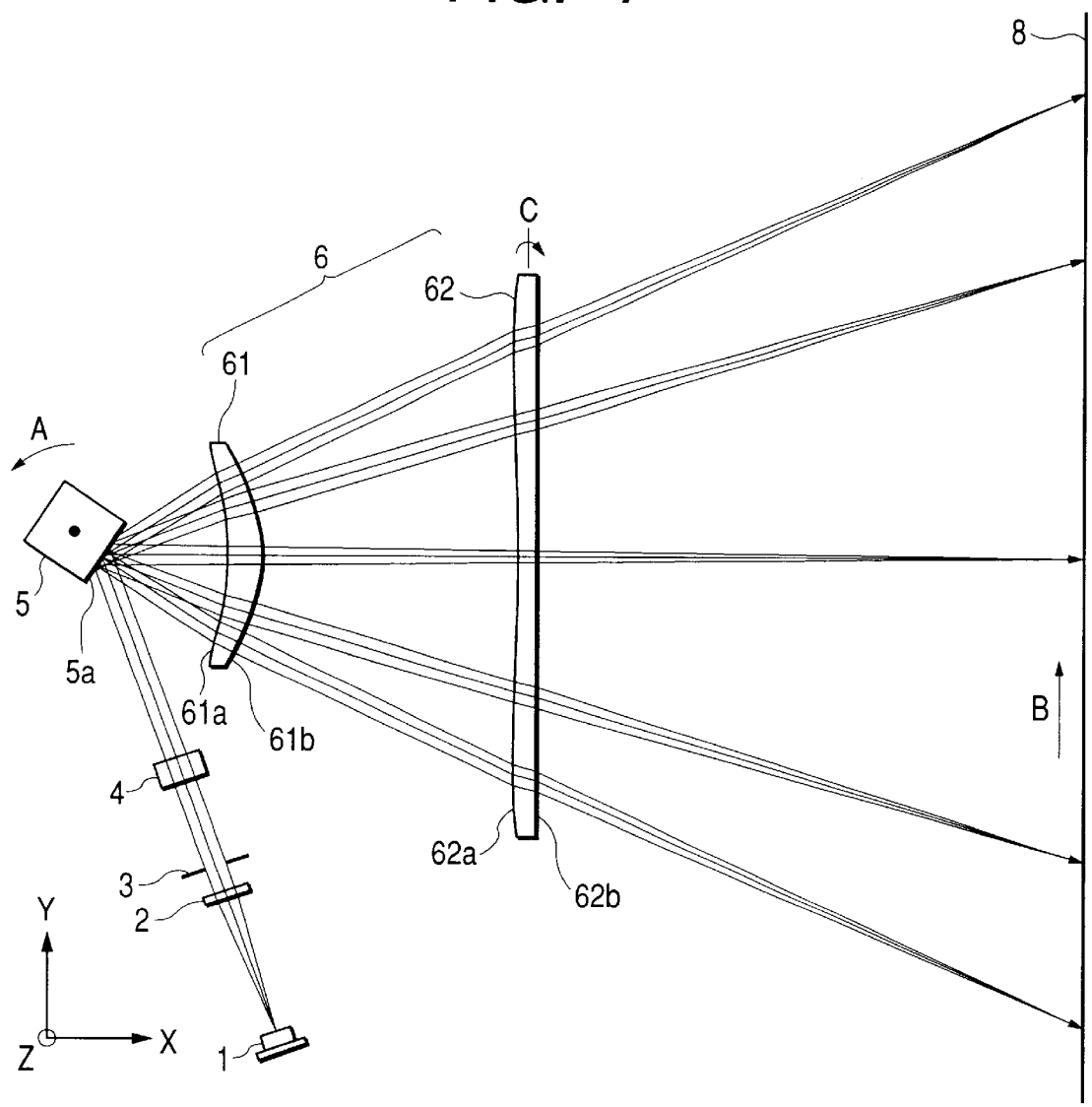
FIG. 1 is a cross-sectional view showing the main part of a main scanning cross-section in the first embodiment of the present invention.

FIG. 1 is a cross-sectional view (main scanning sectional view) showing the main part of the main scanning cross-section of the first embodiment.

In this drawing, reference numeral 1 designates a light source means that is, for instance, a semiconductor laser. Numeral 2 denotes a collimator lens that converts a diverging light beam emitted from the light source means 1 into a substantially parallel light beam. Numeral 3 denotes an aperture stop that limits a passing light beam (quantity of passing light). Numeral 4 represents a cylindrical lens (cylinder lens) that has a predetermined refracting power only in the sub-scanning direction so that the light beam passing through the aperture stop 3 is converged to form a nearly linear image on a deflection surface 5a of an optical deflector 5 (to be described later) in the sub-scanning cross-section.

It should be noted here that each of the collimator lens 2, the aperture stop 3, and the cylindrical lens 4 is a component of an incident optical means.

Numeral 5 denotes a deflection means that is, for instance, a light deflector composed of a polygon mirror (rotary polygon mirror) and is rotated at a constant velocity in the direction of arrow A by a driving means (not shown), such as a motor.

Numeral 6 indicates an image formation means (scanning lens system) that has an fθ characteristic and includes a refractive optical element 61 and a long diffraction optical element 62 that are both made of plastic materials.

The refractive optical element 61 is composed of a single toric lens that has different powers in the main scanning direction (main scanning cross-section) and the sub-scanning direction (sub-scanning cross-section). The toric lens 61 has a meniscus shape in the main scanning cross-section, with the concave surface facing the optical deflector side.

The diffraction optical element 62 has different powers in the main scanning direction and in the sub-scanning direction. An incident surface 62a has a convex shape in the sub-scanning cross-section, with the convex surface facing the optical deflector 5. Also, the incident surface 62a has a concave shape in the main scanning cross-section, with the concave surface facing the optical deflector 5. Further, a diffraction grating is formed on an exit surface 62b. In this embodiment, the toric lens 61 is arranged at or near the front focus position x1 of the diffraction optical element 62 in the sub-scanning cross-section. Also, tilts and bends of a scanning line are corrected by intentionally adjusting the position of the diffraction optical element 62 using at least one of a tilt adjusting means and a shift adjusting means.

In this embodiment, the toric lens 61 is disposed between the optical deflector 5 and the midpoint between the rotation axis of the optical deflector 5 and a photosensitive drum surface 8 (scanning surface). Also, the diffraction optical element 62 is disposed between the photosensitive drum surface 8 and the midpoint between the rotation axis of the optical deflector 5 and the photosensitive drum surface 8. The image formation means 6 forms an image on the photosensitive drum surface 8 using the light beam that is based on image information and has been reflected and deflected by the optical deflector 5. The image formation means 6 also corrects a tilt of the deflection surface 5a of the optical deflector 5 in the sub-scanning cross-section.

Numeral 8 represents a photosensitive drum surface that is to be scanned.

In this embodiment, the diverging light beam emitted from the semiconductor laser 1 is converted into a substantially parallel light beam by the collimator lens 2, the parallel light beam (quantity of light) is limited by the aperture stop 3, and the limited light beam is incident on the cylindrical lens 4. The substantially parallel light beam incident on the cylindrical lens 4 emerges without any change in the main scanning cross-section. On the other hand, in the sub-scanning cross-section, the light beam incident on the cylindrical lens 4 converges to form a nearly linear image (a linear image elongated in the main scanning direction) on the deflection surface 5a of the light deflector 5. The light beam deflected by the deflection surface 5a of the light deflector 5 is guided by the toric lens 61 and the diffraction optical element 62 to strike the photosensitive drum surface 8. By having the light deflector 5 rotate in the direction of an arrow A, the photosensitive drum surface 8 is optically scanned in the direction of an arrow B. In this manner, an image is recorded on the photosensitive drum surface 8 that is a recording medium.

The shapes of the toric lens 61 and the diffraction optical element 62 composing the image formation means 6 of this embodiment are described below.

1. Toric Lens

The following description is based on the assumption that the main scanning cross-section has an aspherical surface shape that can be expressed using a function up to a 10th-order function, the intersection point with the optical axis of the toric lens is set as the origin point, the direction of the optical axis is set as an x axis, the axis perpendicular to the optical axis in the main scanning cross-section is set as a y axis, and the axis perpendicular to the optical axis in the sub-scanning cross-section is set as a z axis.

In this case, the meridional direction corresponding to the main scanning direction is expressed by Expression 1 given below.

$$X=(Y^2/R)/(1+(1-(1+K))(Y/R)^2)^{1/2})+B_4Y^4+B_6Y^6+B_8Y^8+B_{10}Y^{10}+$$ <Expression 1>

(where R is a radius of curvature, and K, $B_4$, $B_6$, $B_8$, and $B_{10}$ are aspherical coefficients)

Also, the sagittal direction corresponding to the sub-scanning direction (the direction that includes the optical axis and is perpendicular to the main scanning direction) is expressed by Expression 2 given below.

$$S=(Z^2/r')/(1+(1-(Z/r')^2)^{1/2})$$ <Expression 2>

(where $r'=r_0(1+D_2Y^2+D_4Y^4+D_6Y^6+D_8Y^8+D_{10}Y^{10})$, $r_0$ is a radius of sagittal curvature, and $D_2$, $D_4$, $D_6$, $D_8$ and $D_{10}$ are aspherical coefficients)

2. Diffraction Optical Element

The diffraction optical element 62 has a diffraction surface. The main scanning cross-section can be expressed by a phase function up to a 10th-order phase function and the sub-scanning cross-section can be expressed by a second-order phase function that differs depending on the position of the main scanning direction.

$$\phi=m\lambda=b_2Y^2+b_4Y^4+b_6Y^6+b_8Y^8+b_{10}Y^{10}+(d_0+d_1Y+d_2Y^2+d_3Y^3+d_4Y^4)Z^2$$

(where φ is a phase function, m is a diffraction order, λ is a wavelength used, Y is a height from the lens optical axis, $b_2$, $b_4$, $b_6$, $d_0$, $d_1$, $d_2$, $d_3$, and $d_4$ are phase coefficients, and the positive first-order diffraction light is used in the first to fifth embodiments)

Numerical values (design values) concerning the image formation means 6 of the first embodiment are given in Table 1.

It should be noted here that in Table 1, the incident surface 61a of the toric lens 61 is referred to as the first surface, the exit surface 61b of the toric lens 61 is referred to as the second surface, the incident surface 62a of the diffraction optical element 62 is referred to as the third surface, and the exit surface 62b of the diffraction optical element 62 is referred to as the fourth surface. The zeroth surface represents the deflection point of the polygon mirror 5. Also, the power on the incident surface 62a of the diffraction optical element 62 in the sub-scanning cross-section is referred to as f1, the power on the exit surface 62b in the sub-scanning cross-section is referred to as f2, the combined power of f1 and f2 is referred to as F, the image formation magnification of the image formation means 6 in the sub-scanning cross-section is referred to as m, the distance between the exit surface 61b on the optical axis of the refractive optical element 61 and the incident surface 62a on the optical axis of the diffraction optical element 62 is referred to as e2, and the distance between the incident surface 62a on the optical axis and the front focus position of the diffraction optical element 62 is referred to as s1.

Also, in Table 1, the reference symbol e0 represents the distance between the deflection means 5 and the incident surface 61a of the toric lens 61, the reference symbol e1 represents the thickness of the toric lens 61 on the optical axis, the reference symbol e3 represents the thickness of the diffraction optical element 62 on the optical axis, and the reference symbol e4 represents the distance between the exit surface 62a of the diffraction optical element 62 and the scanning surface 8.

Further, the reference symbol N1 represents the refractive index of the toric lens 61 and the reference symbol N3 represents the refractive index of the diffraction optical element 62.

TABLE 1

(Numerical Embodiment 1)

| Surface Distance | | Refractive Index | |
|---|---|---|---|
| e0 = | 28.5 | N0 = | 1.000 |
| e1 = | 8.0 | N1 = | 1.524 |
| e2 = | 57.5 | N2 = | 1.000 |
| e3 = | 4.0 | N3 = | 1.524 |
| e4 = | 125.0 | N4 = | 1.000 |

Main Scanning Shape

| | R | K | B4 |
|---|---|---|---|
| First Surface | −6.222E+01 | −2.511E+00 | 3.374E−06 |
| Second Surface | −3.772E+01 | −8.873E−01 | 2.165E−06 |
| Third Surface | −4.060E+02 | 2.820E+01 | 5.962E−07 |
| Fourth Surface | ∞ | 0.000E+00 | 0.000E+00 |

| | B6 | B8 | B10 |
|---|---|---|---|
| First Surface | 1.680E−10 | 0.000E+00 | 0.000E+00 |
| Second Surface | 1.719E−09 | 0.000E+00 | 0.000E+00 |
| Third Surface | −8.980E−11 | 8.342E−15 | 0.000E+00 |
| Fourth Surface | 0.000E+00 | 0.000E+00 | 0.000E+00 |

Sub-Scanning Shape

| | R | D2 | D4 |
|---|---|---|---|
| First Surface | −2.500E+02 | 0.000E+00 | 0.000E+00 |
| Second Surface | −2.824E+01 | 3.246E−05 | −8.387E−08 |
| Third Surface | 7.500E+01 | 0.000E+00 | 0.000E+00 |
| Fourth Surface | ∞ | 0.000E+00 | 0.000E+00 |

| | D6 | D8 | D10 |
|---|---|---|---|
| First Surface | 0.000E+00 | 0.000E+00 | 0.000E+00 |
| Second Surface | 0.000E+00 | 0.000E+00 | 0.000E+00 |
| Third Surface | 0.000E+00 | 0.000E+00 | 0.000E+00 |
| Fourth Surface | 0.000E+00 | 0.000E+00 | 0.000E+00 |

Diffraction Grating

| | b2 | b4 | b6 | b8 |
|---|---|---|---|---|
| Fourth Surface | −1.696E−04 | −1.141E−08 | −3.000E−12 | 2.000E−16 |

| | b10 | d0 | d1 | d2 |
|---|---|---|---|---|
| | −7.000E−21 | −4.008E−03 | 3.319E−07 | 3.338E−08 |

| d3 | d4 |
|---|---|
| 0.000E+00 | 2.123E−13 |

Facts

| f1 | f2 | F | s1 | β | |e2/s1| |
|---|---|---|---|---|---|
| 143.08 | 124.70 | 67.31 | −65.89 | 2.1 | 0.87 |

Figure 5:
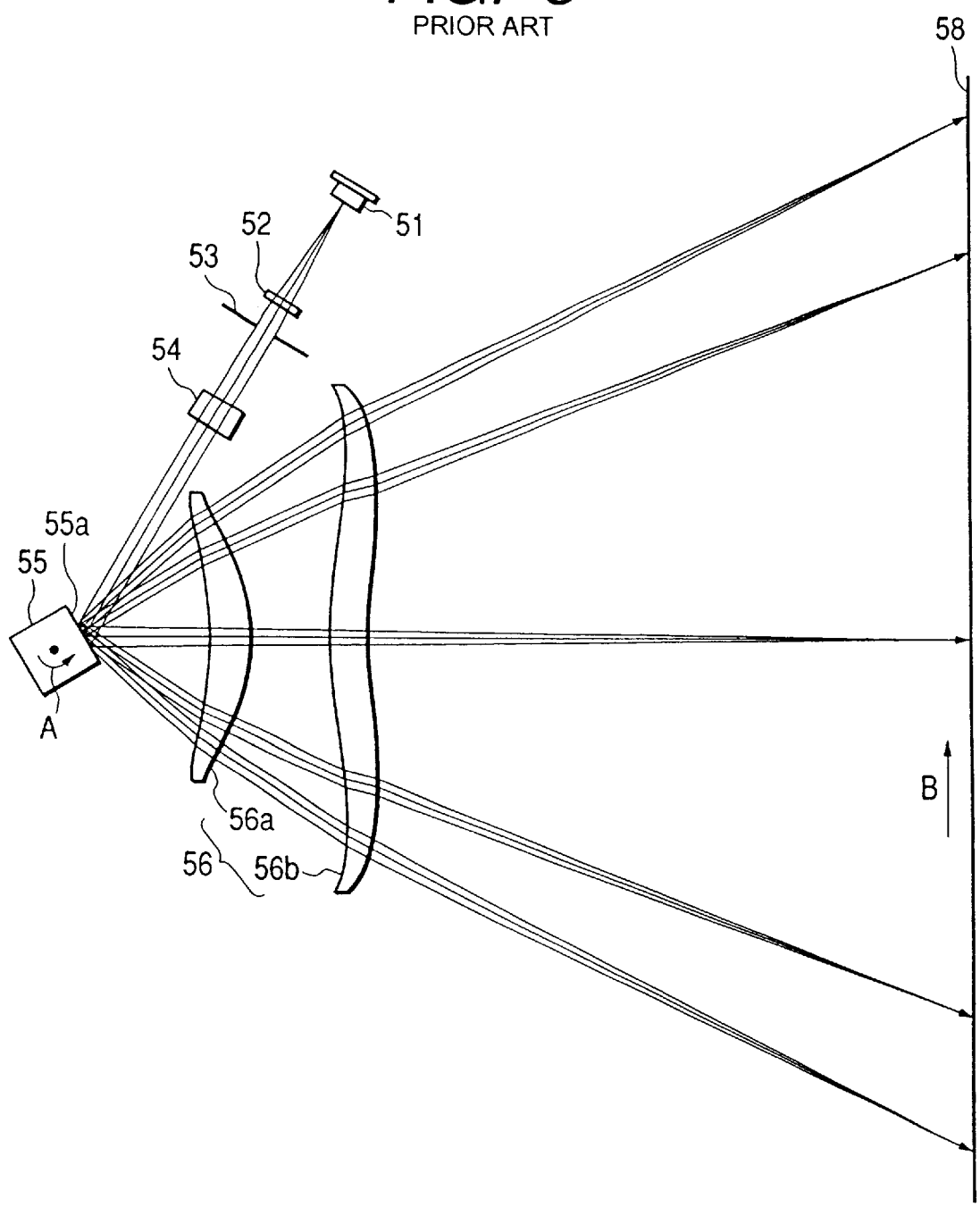
FIG. 5 is a schematic diagram that shows the main part of a conventional scanning optical apparatus.
Figure 6:
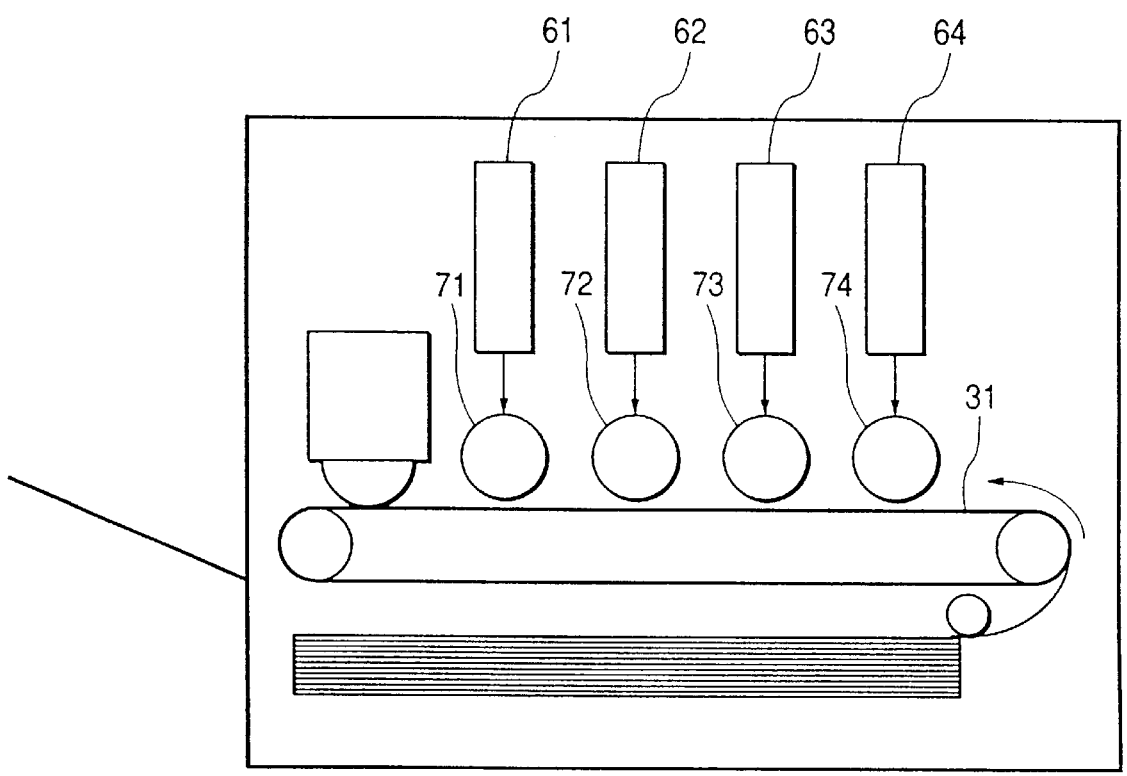
FIG. 6 is a schematic diagram that shows the main part of a conventional tandem type color image forming apparatus.

In this embodiment, if the assembling position of the toric lens 61 is shifted by 0.1 mm in the direction perpendicular to the plane of paper at normal mechanical arrangement accuracy, the bend degree of the scanning line becomes +2.5 $\mu$m, with the convex bend of the scanning line in the shifting direction being regarded as negative. As a result, the present embodiment considerably reduces the bend degree of the scanning line, in comparison with the conventional case shown in FIG. 5.

Figure 2:
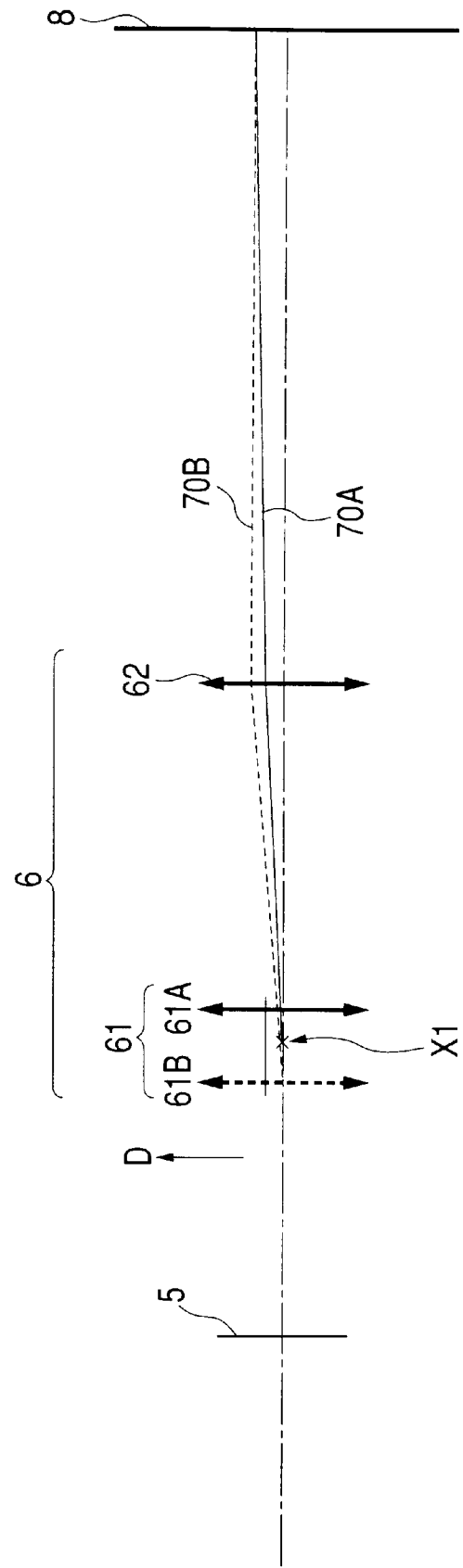
FIG. 2 shows a power arrangement in a sub-scanning cross-section in the first embodiment of the present invention.

This effect obtained in the present embodiment is described in more detail below with reference to FIG. 2. FIG. 2 is a schematic drawing that shows the main part of the power arrangement in the sub-scanning cross-section of the present embodiment. In this drawing, the same components as in FIG. 1 are given the same reference numerals.

As described above, the toric lens 61 of the present embodiment has a meniscus shape in the main scanning cross-section, with the concave surface facing the polygon mirror 5. Therefore, as shown in this drawing, the power in the sub-scanning cross-section has an arrangement in which an off-axis point 61B is located at the polygon mirror 5 side with respect to an on-axis point 61A. In this case, if the toric lens 61 is shifted in the direction of an arrow D (direction perpendicular to the plane of paper in FIG. 1, the Z direction) during assembling, an on-axis principal ray 70A and an off-axis principal ray 70B take the optical paths shown in FIG. 2. This is because the toric lens 61 is disposed at or near the front focus position x1 of the diffraction optical element 62 in the sub-scanning cross-section, as described above.

In more detail, in this embodiment, the power arrangement of the toric lens 61, which is disposed at or near the front focus position x1 of the diffraction optical element 62 in the sub-scanning cross-section, exists between the on-axis point 61A and the off-axis point 61B. Therefore, the on-axis principal ray 70A and the off-axis principal ray 70B reach the diffraction optical element 62 at different heights, as shown in FIG. 2. Before reaching the photosensitive drum surface 8, the on-axis principal ray 70A passing through the diffraction optical element 62 diverges to some extent, while the off-axis principal ray 70B passing through the diffraction optical element 62 converges to some extent. As a result, the on-axis principal ray 70A and the off-axis principal ray 70B reach the scanning surface 8 at substantially the same heights.

The front focus position x1 of the diffraction optical element 62 in the sub-scanning cross-section is set between (a) the power arrangement in the sub-scanning cross-section of an on-axis refractive optical element 61A and (b) the power arrangement in the sub-scanning cross-section of an off-axis refractive optical element 61B in the optical axis direction.

In more detail, in the optical axis direction, the power arrangement in the sub-scanning cross-section of the on-axis refractive optical element 61A is set at the scanning surface 8 side with respect to the front focus position x1, and the power arrangement in the sub-scanning cross-section of the off-axis refractive optical element 61B is set at the polygon mirror 5 side with respect to the front focus position x1. As a result, before reaching the photosensitive drum surface 8, the on-axis principal ray 70A passing through the diffraction optical element 62 diverges to some extent, while the off-axis principal ray 70B passing through the diffraction optical element 62 converges to some extent.

Consequently, even if the position of the toric lens 61 is shifted in the direction of an arrow D (direction perpendicular to the plane of paper in FIG. 1, the Z direction) during assembling, the on-axis principal ray 70A and the off-axis principal ray 70B reach the scanning surface 8 at heights whose difference in the sub-scanning direction falls within an allowable range.

It should be noted here that the object of the present invention is achieved even if the front focus position x1 of the diffraction optical element 62 in the sub-scanning cross-section is not set between the power arrangement in the sub-scanning cross-section of the on-axis refractive optical element 61A and the power arrangement in the sub-scanning cross-section of the off-axis refractive optical element 61B. To do so, Conditional Expression (1) to be described later needs to be satisfied. In this case, even if the toric lens 61 is shifted in the direction of an arrow D (direction perpendicular to the plane of paper in FIG. 1, the Z direction) during assembling, the on-axis principal ray 70A and the off-axis principal ray 70B reach the scanning surface 8 at heights whose difference in the sub-scanning direction falls within an allowable range.

As one modification, the technique of the present invention is applicable to the case where the refractive optical element 61 has a meniscus shape in the main scanning cross-section, with the concave surface facing the scanning surface 8.

In this case, in the optical axis direction, the power arrangement in the sub-scanning cross-section of the on-axis refractive optical element is set at the polygon mirror 5 side with reference to the front focus position x1, and the power arrangement in the sub-scanning cross-section of the off-axis refractive optical element is set at the scanning surface 8 side with respect to the front focus position x1. As a result, before reaching the scanning surface 8, the on-axis principal ray passing through the diffraction optical element 62 converges to some extent, while the off-axis principal ray passing through the diffraction optical element 62 diverges to some extent.

Consequently, the on-axis principal ray and the off-axis principal ray reach the scanning surface 8 at heights whose difference in the sub-scanning direction falls within an allowable range.

As described above, the front focus position x1 of the diffraction optical element 62 in the sub-scanning cross-section is set between the power arrangement in the sub-scanning cross-section of the on-axis refractive optical element 61A and the power arrangement in the sub-scanning cross-section of the off-axis refractive optical element 61B. With this construction, the on-axis principal ray 70A and the off-axis principal ray 70B reach the scanning surface 8 at substantially the same heights in the sub-scanning direction. This effect is achieved by the diffraction optical element that has a flat shape in the main scanning cross-section.

The diffraction optical element 62 is provided to compensate for focus changes in the sub-scanning cross-section that are caused by the changes in refractive index of the material (such as a plastic material) of the refractive optical element due to environmental variations. This construction achieves various effects described below. First, it becomes unnecessary to form the diffraction optical element 62 such that a base surface shape of the diffraction optical element 62 has a bent shape. Second, the position of the front principal plane of the diffraction optical element 62 is less changed in the optical axis direction from an on-axis position to an off-axis position. Third, the disposition of the refractive optical element 61 can be considered by approximately fixing the front principal plane of the diffraction optical element 62 at a certain position in the optical axis direction. Finally, it becomes easy to design a scanning optical apparatus where the front focus position x1 of the diffraction optical element 62 in the sub-scanning cross-section is set between the power arrangement in the sub-scanning cross-section of the on-axis refractive optical element 61A and the power arrangement in the sub-scanning cross-section of the off-axis refractive optical element 61B.

It is publicly known that the allowable degree of bend of a scanning line in a scanning optical apparatus is around ±10 μm. In this embodiment, each component is set so as to satisfy Conditional Expression (1) given below.

$$0.5 < |e2/s1| < 1.2 \quad (1)$$

In this expression, e2 is the distance between the exit surface of the refractive optical element on the optical axis and the incident surface of the diffraction optical element on the optical axis. Also, s1 is the distance between the incident surface of the diffraction optical element on the optical axis and the front focus position of the diffraction optical element in the sub-scanning cross-section.

Conditional Expression (1) regulates the allowable degree of bend of a scanning line. A situation where the upper limit in Conditional Expression (1) is exceeded should be avoided because the bend degree exceeds +10 μm. Also, a situation where the lower limit in Conditional Expression (1) is exceeded should be avoided because the bending degree exceeds −10 μm. Further, if the lower limit in Conditional Expression (1) is exceeded, the sub-scanning magnification is at least tripled and a scanning line tends to be displaced from a desired position due to the processing errors of reflection surfaces of a polygon mirror and the vibrations of the apparatus itself. That is, the so-called jitter tends to occur if the lower limit in Conditional Expression (1) is exceeded. As a result, such a situation should be avoided.

It should be noted here that in this embodiment, it is more preferable to set the upper limit and lower limit in Conditional Expression (1) as follows.

$$0.55 < |e2/s1| < 1.1 \quad (1a)$$

In this embodiment, the power in the sub-scanning cross-section of the diffraction optical element 62 is approximately equally distributed between the incident surface 62a and the exit surface 62b, as shown in Table 1 described above. If a design is made such that all power at the incident surface 62a side in the sub-scanning cross-section is allotted to the diffraction grating of the exit surface 62b, the number of gratings of the diffraction grating shown in Table 1 needs to be approximately doubled, and as a result it is hard to effect processing of a mold and to mold a lens in view of the accuracy.

As described above, in this embodiment, the power is appropriately distributed with the construction where the incident surface of the diffraction optical element 62 has a convex shape in the sub-scanning cross-section facing the optical deflector 5. Also, the positive power arrangement of rear element of the image formation means 6 including two elements is made relatively large, and the sub-scanning magnification of the image formation means 6 is reduced. These improve the performance such as jitter, image quality and the like of the scanning optical apparatus.

The power of the diffraction grating in the sub-scanning cross-section is set so as to compensate for focus changes in the sub-scanning cross-section that are caused by the changes in refractive index of the material (such as a plastic material) of the refractive optical element due to environmental variations. Because the positive power of the diffraction grating on the exit surface 62a cannot be made infinitely large for the sake of reducing the sub-scanning magnification, however, the power of the diffraction optical element 62 which is the rear element is increased as much as possible by utilizing the shape of the base surface of the diffraction grating.

That is, the positive power of the diffraction optical element 62 is made as large as possible.

Also, in this embodiment, the incident surface of the diffraction optical element 62 has a convex shape in the sub-scanning cross-section facing the optical deflector 5, thereby increasing design flexibility. Further, by optimizing the power ratio in the sub-scanning direction between the toric lens 61 and the diffraction optical element 62, for instance, focus changes that are caused by the changes in refractive index of plastic due to environmental variations are easily compensated for using the changes in wavelength of the semiconductor laser 1 or the like.

Further, in this embodiment, the toric lens 61 is disposed at or near the front focus position of the diffraction optical element 62 in the sub-scanning cross-section, as described above. This construction reduces the sensitivity of a scanning line to the positional accuracy of the toric lens 61.

If bends of a scanning line tend to occur due to the positional accuracy of the diffraction optical element 62, the position (posture) of the diffraction optical element 62 is adjusted using the tilt adjusting means (not shown). For instance, it is possible to make fine adjustments to bends of a scanning line by rotating the diffraction optical element 62 about an axis that is parallel to the longitudinal direction of the diffraction optical element 62, as indicated by an arrow C in FIG. 1. Also, it is possible to make fine adjustments to bends of a scanning line and magnifications by shifting the position of the diffraction optical element 62 in a direction perpendicular to the plane of paper in FIG. 1 (in the Z direction) or in the longitudinal direction using the shift adjusting means (not shown). Further, it is possible to make fine adjustments to tilt of a scanning line by rotating the diffraction optical element 62 about the optical axis.

In the above explanation, the image formation means (the scanning lens system) having an fθ characteristic includes the refractive optical element 61 and the long diffraction optical element 62 that are both made of plastic materials. However, the present embodiment is not limited to this. If the further improvement in performance is required by design specifications and the aberration correction needs to be performed with higher accuracy, for instance, at least one of the refractive optical element 61 and the diffraction optical element 62 may be provided with a lens group using a plurality of optical elements. In this case, the power of the at least one of the refractive optical element 61 and the diffraction optical element 62 is distributed among the plurality of optical elements. Even if the scanning optical system includes three or more optical elements in total, it is possible to appropriately distribute power by forming at least one of the incident surface and exit surface of the diffractive optical element to have a convex shape in the sub-scanning cross-section. Also, aside from a plastic material, the optical element may be made of a glass material that has been polished and cut or of a hybrid material where a diffraction grating has been formed on a glass base member using a resin material.

Second Embodiment

Table 2 below gives indicates numerical example 2 values concerning an image formation means according to the second embodiment. This embodiment differs from the first embodiment in the design values of the image formation means. The other structure and optical action are substantially the same as in the first Embodiment, thereby achieving the same effect.

TABLE 2

(Numerical Embodiment 2)

| Surface Distance | Refractive Index |
|---|---|
| $e0 = 30.0$ | $N0 = 1.000$ |
| $e1 = 9.0$ | $N1 = 1.524$ |
| $e2 = 63.0$ | $N2 = 1.000$ |
| $e3 = 5.0$ | $N3 = 1.524$ |
| $e4 = 122.0$ | $N4 = 1.000$ |

Main Scanning Shape

| | R | K | B4 |
|---|---|---|---|
| First Surface | −5.419E+01 | −2.495E+00 | 3.384E−06 |
| Second Surface | −3.524E+01 | −8.202E−01 | 2.148E−06 |
| Third Surface | −4.170E+02 | 2.821E+01 | 5.853E−07 |
| Fourth Surface | ∞ | 0.000E+00 | 0.000E+00 |
| | B6 | B8 | B10 |
| First Surface | 1.539E−10 | 0.000E+00 | 0.000E+00 |
| Second Surface | 1.713E−09 | 0.000E+00 | 0.000E+00 |
| Third Surface | −8.947E−11 | 8.078E−15 | 0.000E+00 |
| Fourth Surface | 0.000E+00 | 0.000E+00 | 0.000E+00 |

Sub-Scanning Shape

| | R | D2 | D4 |
|---|---|---|---|
| First Surface | −2.500E+02 | 0.000E+00 | 0.000E+00 |
| Second Surface | −3.114E+01 | 8.459E−05 | −8.129E−08 |
| Third Surface | 9.000E+01 | 0.000E+00 | 0.000E+00 |
| Fourth Surface | ∞ | 0.000E+00 | 0.000E+00 |
| | D6 | D8 | D10 |
| First Surface | 0.000E+00 | 0.000E+00 | 0.000E+00 |
| Second Surface | 0.000E+00 | 0.000E+00 | 0.000E+00 |
| Third Surface | 0.000E+00 | 0.000E+00 | 0.000E+00 |
| Fourth Surface | 0.000E+00 | 0.000E+00 | 0.000E+00 |

Diffraction Grating

| | b2 | b4 | b6 | b8 |
|---|---|---|---|---|
| Fourth Surface | −1.876E−04 | −1.155E−08 | −3.010E−12 | 2.004E−16 |
| | b10 | d0 | d1 | d2 |
| | −7.002E−21 | −4.031E−03 | 3.041E−07 | 2.351E−07 |
| | d3 | d4 | | |
| | 0.000E+00 | 2.123E−13 | | |

Facts

| f1 | f2 | F | s1 | β | |e2/s1| |
|---|---|---|---|---|---|
| 171.69 | 124.03 | 72.82 | −70.89 | 2.1 | 0.89 |

In this embodiment, if the assembling position of the toric lens is shifted by 0.1 mm in the direction perpendicular to the plane of paper in FIG. 1 with normal mechanical arrangement accuracy, the bend degree of a scanning line becomes +0.9 μm, with the convex bend of the scanning line in the shifting direction being regarded as negative. As a result, the present embodiment considerably reduces the bend degree of the scanning line, in comparison with the conventional case shown in FIG. 5.

Third Embodiment

Table 3 below indicates numerical example 3 concerning an image formation means according to the third embodiment. This embodiment differs from the first embodiment in the design values of the image formation means. The other structure and optical action are substantially the same as in the first Embodiment, thereby achieving the same effect.

TABLE 3

(Numerical Embodiment 3)

| Surface Distance | | Refractive Index | |
|---|---|---|---|
| e0 = | 25.0 | N0 = | 1.000 |
| e1 = | 9.0 | N1 = | 1.524 |
| e2 = | 63.0 | N2 = | 1.000 |
| e3 = | 4.0 | N3 = | 1.524 |
| e4 = | 121.0 | N4 = | 1.000 |

Main Scanning Shape

| | R | K | B4 |
|---|---|---|---|
| First Surface | −6.785E+01 | −4.855E+00 | 3.278E−06 |
| Second Surface | −4.008E+01 | −5.888E−01 | 3.089E−06 |
| Third Surface | −4.550E+02 | 3.506E+01 | 5.164E−07 |
| Fourth Surface | | 0.000E+00 | 0.000E+00 |
| | B6 | B8 | B10 |
| First Surface | −1.845E−10 | 0.000E+00 | 0.000E+00 |
| Second Surface | 1.415E−09 | 0.000E+00 | 0.000E+00 |
| Third Surface | −7.583E−11 | 7.148E−15 | 0.000E+00 |
| Fourth Surface | 0.000E+00 | 0.000E+00 | 0.000E+00 |

Sub-Scanning Shape

| | R | D2 | D4 |
|---|---|---|---|
| First Surface | −1.500E+02 | 0.000E+00 | 0.000E+00 |
| Second Surface | −2.391E+01 | 1.091E−04 | −1.660E−07 |
| Third Surface | 6.000E+01 | 0.000E+00 | 0.000E+00 |
| Fourth Surface | ∞ | 0.000E+00 | 0.000E+00 |
| | D6 | D8 | D10 |
| First Surface | 0.000E+00 | 0.000E+00 | 0.000E+00 |
| Second Surface | 0.000E+00 | 0.000E+00 | 0.000E+00 |
| Third Surface | 0.000E+00 | 0.000E+00 | 0.000E+00 |
| Fourth Surface | 0.000E+00 | 0.000E+00 | 0.000E+00 |

Diffraction Grating

| | b2 | b4 | b6 | b8 |
|---|---|---|---|---|
| Fourth Surface | −1.945E−04 | −5.752E−09 | −2.998E−12 | 2.011E−16 |
| | b10 | d0 | d1 | d2 |
| | −7.003E−21 | −3.138E−03 | 3.378E−07 | 3.395E−08 |
| | d3 | d4 | | |
| | 0.000E+00 | 2.112E−13 | | |

Facts

| f2 | F | s1 | β | |e2/s1| |
|---|---|---|---|---|
| 159.33 | 67.25 | −64.14 | 2.2 | 0.98 |

In this embodiment, if the assembling position of the toric lens is shifted by 0.1 mm in the direction perpendicular to the plane of paper in FIG. 1 with normal mechanical arrangement accuracy, the bend degree of a scanning line becomes −0.6 μm, with the convex bend of the scanning line in the shifting direction being regarded as negative. As a result, the present embodiment considerably reduces the bend degree of the scanning line, in comparison with the conventional case shown in FIG. 5.

Fourth Embodiment

Table 4 below indicates numerical example 4 concerning an image formation means according to the fourth embodiment. This embodiment differs from the first embodiment in the design values of the image formation means. The other structure and optical action are substantially the same as in the first Embodiment, thereby achieving the same effect.

TABLE 4

(Numerical Embodiment 4)

| Surface Distance | | Refractive Index | |
|---|---|---|---|
| e0 = | 28.5 | N0 = | 1.000 |
| e1 = | 8.0 | N1 = | 1.524 |
| e2 = | 57.5 | N2 = | 1.000 |
| e3 = | 4.0 | N3 = | 1.524 |
| e4 = | 125.0 | N4 = | 1.000 |

Main Scanning Shape

| | R | K | B4 |
|---|---|---|---|
| First Surface | −6.222E+01 | −2.511E+00 | 3.374E−06 |
| Second Surface | −3.772E+01 | −8.873E−01 | 2.165E−06 |
| Third Surface | −4.060E+02 | 2.820E+01 | 5.962E−07 |
| Fourth Surface | ∞ | 0.000E+00 | 0.000E+00 |
| | B6 | B8 | B10 |
| First Surface | 1.680E−10 | 0.000E+00 | 0.000E+00 |
| Second Surface | 1.719E−09 | 0.000E+00 | 0.000E+00 |
| Third Surface | −8.980E−11 | 8.342E−15 | 0.000E+00 |
| Fourth Surface | 0.000E+00 | 0.000E+00 | 0.000E+00 |

Sub-Scanning Shape

| | R | D2 | D4 |
|---|---|---|---|
| First Surface | 1.179E+01 | 0.000E+00 | 0.000E+00 |
| Second Surface | 1.376E+01 | −1.307E−04 | 8.246E−08 |
| Third Surface | 6.000E+01 | 0.000E+00 | 0.000E+00 |
| Fourth Surface | ∞ | 0.000E+00 | 0.000E+00 |
| | D6 | D8 | D10 |
| First Surface | 0.000E+00 | 0.000E+00 | 0.000E+00 |
| Second Surface | 0.000E+00 | 0.000E+00 | 0.000E+00 |
| Third Surface | 0.000E+00 | 0.000E+00 | 0.000E+00 |
| Fourth Surface | 0.000E+00 | 0.000E+00 | 0.000E+00 |

Diffraction Grating

| | b2 | b4 | b6 | b8 |
|---|---|---|---|---|
| Fourth Surface | −1.696E−04 | −1.141E−08 | −3.000E−12 | 2.000E−16 |
| | b10 | d0 | d1 | d2 |
| | −7.003E−21 | −4.909E−03 | 2.843E−07 | 5.377E−07 |
| | d3 | d4 | | |
| | 0.000E+00 | 2.123E−13 | | |

Facts

| f1 | f2 | F | s1 | β | |e2/s1| |
|---|---|---|---|---|---|
| 114.46 | 101.86 | 54.56 | −53.15 | 1.7 | 1.08 |

In this embodiment, if the assembling position of the toric lens is shifted by 0.1 mm in the direction perpendicular to the plane of paper in FIG. 1 with normal mechanical arrangement accuracy, the bend degree of a scanning line becomes +8.3 μm, with the convex bend of the scanning line in the shifting direction being regarded as negative. As a result, the present embodiment considerably reduces the bend degree of the scanning line, in comparison with the conventional case shown in FIG. 5.

Fifth Embodiment

Table 5 below indicates numerical example 5 concerning an image formation means according to the fifth embodiment. This embodiment differs from the first embodiment in the design values of the image formation means. The other structure and optical action are substantially the same as in the first Embodiment, thereby achieving the same effect.

TABLE 5

(Numerical Embodiment 5)

| Surface Distance | | Refractive Index | |
|---|---|---|---|
| e0 = | 28.5 | N0 = | 1.000 |
| e1 = | 8.0 | N1 = | 1.524 |
| e2 = | 57.5 | N2 = | 1.000 |
| e3 = | 4.0 | N3 = | 1.524 |
| e4 = | 125.0 | N4 = | 1.000 |

Main Scanning Shape

| | R | K | B4 |
|---|---|---|---|
| First Surface | −6.222E+01 | −2.511E+00 | 3.374E−06 |
| Second Surface | −3.772E+01 | −8.873E−01 | 2.165E−06 |
| Third Surface | −4.060E+02 | 2.820E+01 | 5.962E−07 |
| Fourth Surface | ∞ | 0.000E+00 | 0.000E+00 |

| | B6 | B8 | B10 |
|---|---|---|---|
| First Surface | 1.680E−10 | 0.000E+00 | 0.000E+00 |
| Second Surface | 1.719E−09 | 0.000E+00 | 0.000E+00 |
| Third Surface | −8.980E−11 | 8.342E−15 | 0.000E+00 |
| Fourth Surface | 0.000E+00 | 0.000E+00 | 0.000E+00 |

Sub-Scanning Shape

| | R | D2 | D4 |
|---|---|---|---|
| First Surface | −5.255E+01 | 0.000E+00 | 0.000E+00 |
| Second Surface | −1.563E+01 | 6.095E−06 | 2.434E−08 |
| Third Surface | 2.500E+01 | 0.000E+00 | 0.000E+00 |
| Fourth Surface | ∞ | 0.000E+00 | 0.000E+00 |

| | D6 | D8 | D10 |
|---|---|---|---|
| First Surface | 0.000E+00 | 0.000E+00 | 0.000E+00 |
| Second Surface | 0.000E+00 | 0.000E+00 | 0.000E+00 |
| Third Surface | 0.000E+00 | 0.000E+00 | 0.000E+00 |
| Fourth Surface | 0.000E+00 | 0.000E+00 | 0.000E+00 |

Diffraction Grating

| | b2 | b4 | b6 | b8 |
|---|---|---|---|---|
| Fourth Surface | −1.696E−04 | −1.141E−08 | −3.000E−12 | 2.000E−16 |

| b10 | d0 | d1 | d2 |
|---|---|---|---|
| −7.003E−21 | −3.898E−03 | 6.286E−07 | 3.485E−08 |

| d3 | d4 | | |
|---|---|---|---|
| 0.000E+00 | 2.123E−13 | | |

Facts

| f1 | f2 | F | s1 | β | |e2/s1| |
|---|---|---|---|---|---|
| 476.92 | 128.27 | 101.52 | −99.45 | 3.0 | 0.58 |

In this embodiment, if the assembling position of the toric lens is shifted by 0.1 mm in the direction perpendicular to the plane of paper in FIG. 1 with normal mechanical arrangement accuracy, the bend degree of a scanning line becomes −7.6 µm, with the convex bend of the scanning line in the shifting direction being regarded as negative. As a result, the present embodiment considerably reduces the bend degree of the scanning line, in comparison with the conventional case shown in FIG. 5.

As described above, in each embodiment, the power of the diffraction optical element 62 in the sub-scanning cross-section is distributed between the incident surface (the refractive surface) 62a and the exit surface (the diffraction surface) 62b. This construction allows the power on the diffraction surface 62b to be set at a level that is desirable for temperature compensation, with the positive power of the refractive surface 62a being increased and the power of the diffraction optical element 62 being increased. Also, because the positive power of the diffraction optical element 62 disposed at a far side with respect to the polygon mirror 5 becomes large, it is possible to reduce the sub-scanning magnification of the image formation means 6 as necessary. These effects improve the performance, such as jitter and image quality, of the scanning optical apparatus.

Also, in each embodiment, the toric lens 61 is disposed at or near the front focus position of the diffraction optical element 62 in the sub-scanning cross-section. This construction achieves a scanning optical apparatus that is resistant to occurrence of bends of a scanning line even if the toric lens 61 is eccentrically disposed due to manufacturing errors. Also, in addition to the prevention of eccentric arrangement of the diffraction optical element 62, the position of the diffraction optical element 62 is intentionally shifted so as to adjust the bends of a scanning line due to the eccentric arrangements of optical components other than the diffraction optical element 62 because of manufacturing errors. As a result, the bend degree of a scanning line is reduced in a scanning optical apparatus. In particular, in a tandem type color image forming apparatus, this construction reduces registration deviations of each color (chromatic deviations) and prevents degradation of image quality.

Further, in each embodiment described above, the light source means is constituted by a single-beam laser having a single light source. However, the present invention is not limited to this and the light source means may be constituted by a multi-beam laser having a plurality of light sources. Also, in each embodiment, the toric lens and diffraction optical element constituting the image formation means are both made of plastic materials. However, the present invention is not limited to this and the toric lens and diffraction optical element may be instead made of materials produced by glass molds or replica-pressing resin materials on glass base members. This construction also achieves the effects of the present invention. Also, the optical deflector and the incident optical means provided before the optical deflector may also be modified in various manners.

In each embodiment, the incident surface 62a of the diffraction optical element has a convex shape in the sub-scanning cross-section, with the convex surface facing the optical deflector 5. However, the present invention is not limited to this. For instance, the exit surface 62b of the diffraction optical element may have a convex shape in the sub-scanning cross-section, with the convex surface facing the photosensitive drum surface 8. Also, the exit surface 62b may have a concave shape in the main scanning cross-section, with the concave surface facing the photosensitive drum surface 8. These constructions also achieve the effects described above.

In each embodiment, a diffraction grating is formed on the exit surface 62b of the diffraction optical element. However, the present invention is not limited to this and a diffraction grating may be instead formed on the incident surface 62a. Also, although each of the refractive optical element and the diffraction optical element is constituted by a single element in each embodiment, the refractive optical element and diffraction optical element may be constituted by a plurality of elements, respectively.

Image Forming Apparatus

Figure 3:
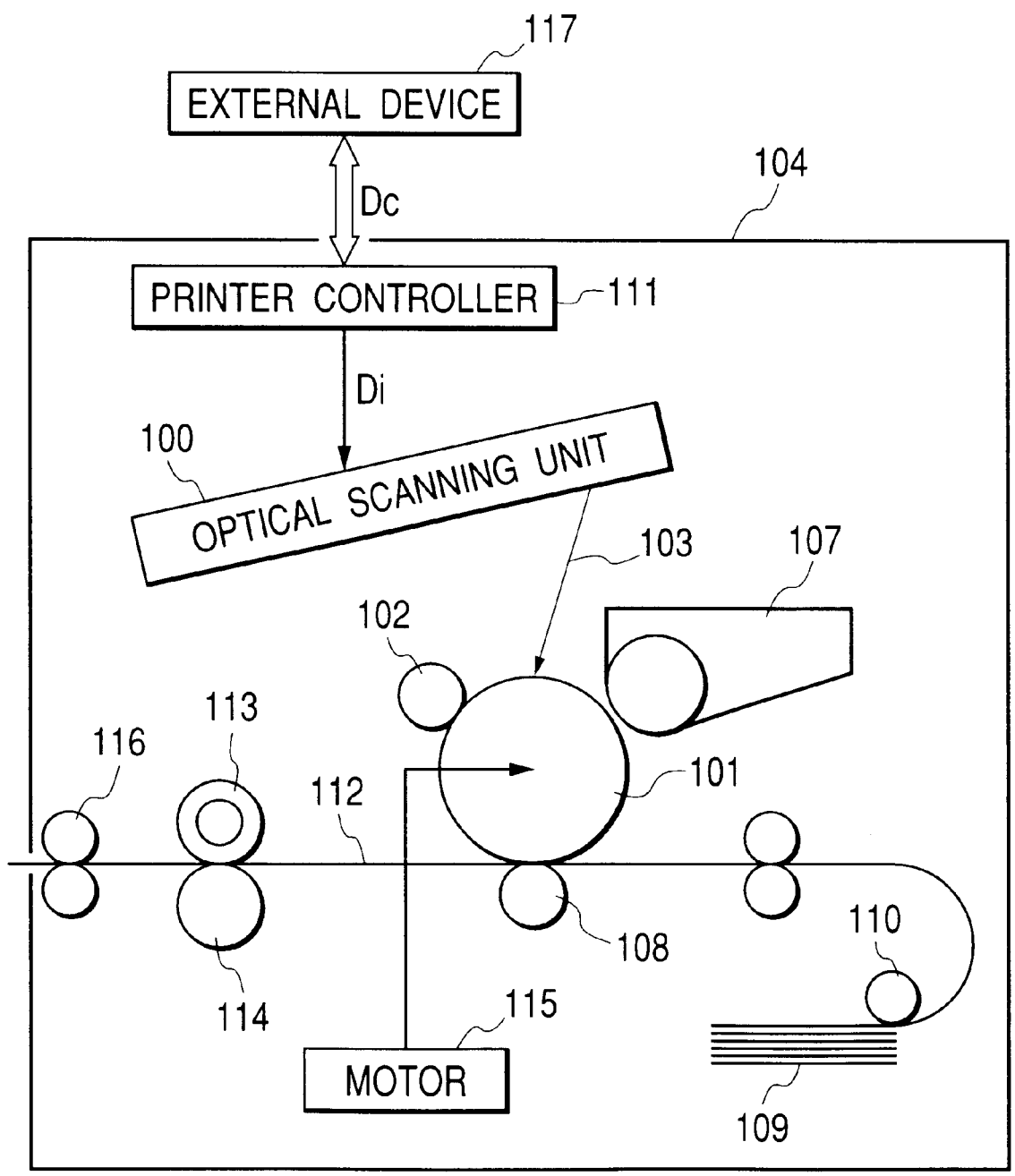
FIG. 3 is a cross-sectional view in the sub-scanning direction that shows the main part of an example construction of an image forming apparatus (an electrophotographic printer) to which the scanning optical apparatus of the present invention is applied.

FIG. 3 is a cross-sectional view in the sub-scanning direction that shows the main part of an embodiment of an image forming apparatus (an electrophotographic printer) to which the scanning optical apparatus of the present invention is applied. In this drawing, reference numeral 104 denotes the image forming apparatus. This image forming apparatus 104 receives code data Dc from an external device 117, such as a personal computer. The code data Dc is converted into image data (dot data) Di by a built-in printer controller 111 and the image data Di is inputted into an optical scanning unit 100. Then, the optical scanning unit (a scanning optical apparatus) 100 emits a light beam (a light beam) 103 that has been modulated according to the image data Di, and the light beam 103 scans the photosensitive surface of a photosensitive drum 101 in the main scanning direction.

The photosensitive drum 101 that is an electrostatic latent image bearing member is rotated clockwise by a motor 115. In accordance with this rotation, the photosensitive surface of the photosensitive drum 101 moves in the sub-scanning direction that is perpendicular to the main scanning direction with respect to the light beam 103. A charging roller 102 that uniformly charges the surface of the photosensitive drum 101 is provided so as to contact the upper surface of the photosensitive drum 101. The surface of the photosensitive drum 101 charged by the charging roller 102 is irradiated with the light beam 103 scanned by the optical scanning unit 100.

As described above, the light beam 103 has been modulated according to the image data Di and an electrostatic latent image is formed on the surface of the photosensitive drum 101 by irradiating the surface with the light beam 103. This electrostatic latent image is developed as a toner image by the developer 107 that is arranged to contact the photosensitive drum 101 at a position following the irradiation position of the light beam 103 in the rotational direction of the photosensitive drum 101. For instance, in this embodiment, the particles of toner are charged to have a reverse polarity of the charge formed by the charging roller 102, and normal development or reverse development is performed using this toner. The normal development means a process where the toner adheres to non-exposed areas of the photosensitive drum (scanning portion). The reverse development means a process where the toner adheres to exposed areas of the photosensitive drum.

The toner image developed by the developing device 107 is transferred to a sheet 112 (a material to be transferred) by a transfer roller 108 that is arranged to face the photosensitive drum 101 in its undersurface. The sheet 112 is contained in a sheet cassette 109 that is arranged to precede the photosensitive drum 101 (on the right side of FIG. 3), although the sheet may be manually fed. A feeding roller 110 is arranged at one end of the sheet cassette 109 and feeds the sheet 112 contained in the sheet cassette 109 to a conveyance path.

The sheet 112 onto which an unfixed toner image has been transferred in this manner is further transported to a fixing device arranged to follow the photosensitive drum 101 (on the left side of FIG. 3). The fixing device is composed of a fixing roller 113 including a fixing heater (not shown) inside and a pressure roller 114 that is brought into pressurized contact with the fixing roller 113. With this construction, the fixing device fixes the unfixed toner image on the sheet 112 transported from the transfer unit by applying pressure and heat to the sheet 112 at the pressure contact point between the fixing roller 113 and the pressure roller 114. Discharge rollers 116 are further arranged to follow the fixing roller 113. After the toner image is fixed on the sheet 112, the discharge rollers 116 discharge the sheet 112 outside the image forming apparatus.

Although not shown in FIG. 3, in addition to the aforementioned data conversion, the printer controller 111 performs control of each component, such as the motor 115, in the image forming apparatus and the polygon motor in the optical scanning unit 100.

Color Image Forming Apparatus

Figure 4:
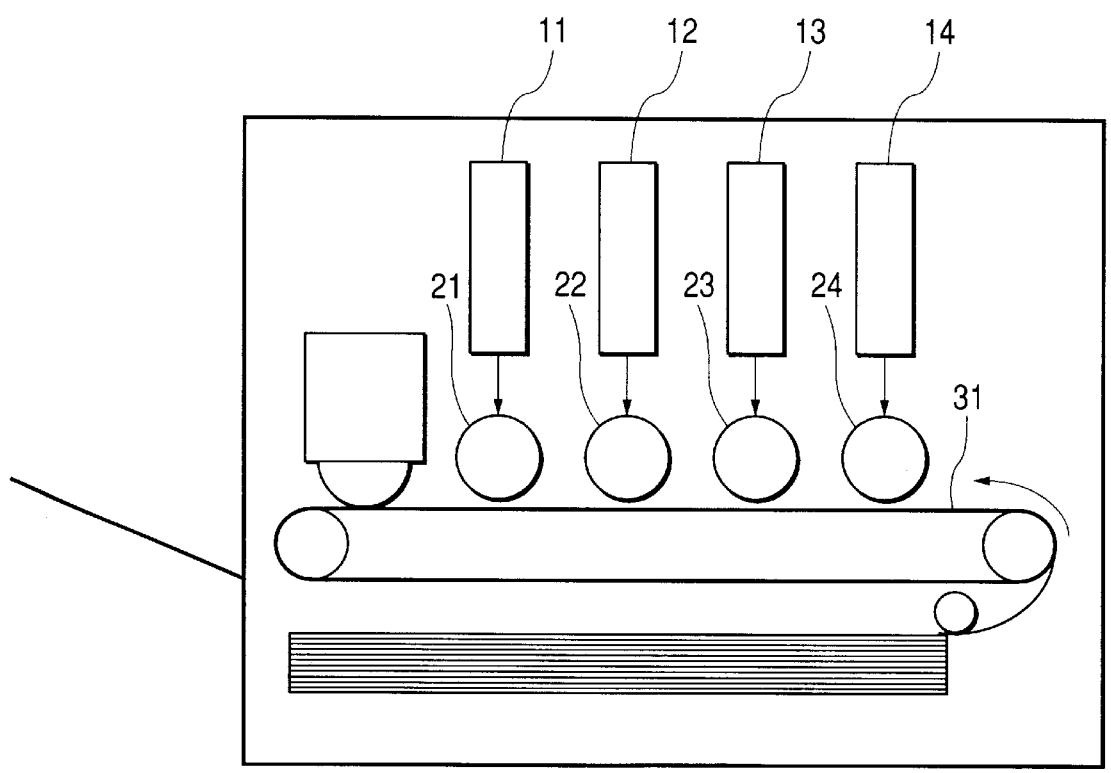
FIG. 4 is a schematic diagram that shows the main part of a tandem type color image forming apparatus of the present invention.

FIG. 4 is a schematic drawing that shows the main part of a tandem type color image forming apparatus that simultaneously uses a plurality of scanning optical apparatuses of one of the first to fifth embodiments. With this construction, this color image forming apparatus records image information in different colors on surfaces of photosensitive drums that each correspond to one of the colors, thereby forming a color image.

In this drawing, reference numerals 11, 12, 13, and 14 indicates the scanning optical apparatus according to either one of the first to fifth embodiments, reference numerals 21, 22, 23, and 24 indicates a photosensitive drum that is an image bearing member, and numeral 31 indicates a transport belt.

The color image forming apparatus shown in FIG. 4 includes the four scanning optical apparatuses (11, 12, 13, and 14) described above that are each arranged to correspond to one color out of C (cyan), M (magenta), Y (yellow), and B (black). These scanning optical apparatuses record image signals on the photosensitive drum surfaces (21, 22, 23, and 24) in parallel, and the image signals are transferred onto a recording material so that the image signals are superimposed on each other. In this manner, the color image forming apparatus prints one full-color image at high speed.

The stated construction where a plurality of scanning optical apparatuses of the present invention are used in a color image forming apparatus realizes high-speed printing of high-quality images including less registration deviations of each color (chromatic deviations).

The present invention realizes a scanning optical apparatus that achieves meritorious effects described below and an image forming apparatus using the scanning optical apparatus.

(b-1) The incident surface of the diffraction optical element has a convex shape in the sub-scanning cross-section. This construction properly distributes power, makes the power arrangement of the succeeding element (second element) of the image formation means composed of two elements relatively large, and reduces the sub-scanning magnification of the image formation means. As a result, a high-performance scanning optical apparatus is realized in which performance, such as jitter and image quality, is improved.

Also, the stated construction realizes a greater flexibility in designing the scanning optical apparatus, so that it is possible to set the power ratio between the refractive optical element and the diffraction optical element at a desired ratio. As a result, it becomes easy to design the scanning optical apparatus with respect to the aberration correction and compensation for temperature at a focus position. Also, by changing the power of the diffraction optical element as necessary, it becomes possible to appropriately set the grating pitch of the diffraction grating. As a result, it becomes easy to manufacture the scanning optical apparatus.

(b-2) The refractive optical element is disposed near the front focus position of the diffraction optical element in the sub-scanning cross-section. Therefore, even if the refractive optical element and the diffraction optical element are eccentrically arranged due to manufacturing errors or the like caused during the manufacturing and assembling of the scanning optical apparatus, the locus of a laser spot, that is, bends of the scanning line can be reduced in the scanning optical apparatus. In particular, in a tandem type color image forming apparatus, the reduction in the differences in bend degree of scanning line among scanning optical apparatuses corresponding to respective colors reduces registration deviations of each color (chromatic deviations) and improves image quality.

Also, with the present invention, it is possible to intentionally perform tilt adjusting and/or shift adjusting for the position of the diffraction optical element. For instance, it is possible to adjust the position of the diffraction optical element by, for example, rotating it about an axis parallel to the longitudinal direction of the diffraction optical element. In this manner, the bends of a scanning line due to the eccentric arrangements of optical components other than the diffraction optical element because of manufacturing errors are finely adjusted. As a result, in a color image forming apparatus, less registration deviations of each color (chromatic deviations) occur and image quality is improved.

What is claimed is:

1. A scanning optical apparatus comprising:

incident optical means for causing at least one light beam emitted from light source means to be incident on deflection means; and image formation means including at least one refractive optical element and at least one diffraction optical element for imaging the at least one light beam reflected and deflected by the deflection means on a surface to be scanned, wherein a front focus position of the diffraction optical element in the sub-scanning cross-section is provided between a power arrangement in the sub-scanning cross-section of an on-axis of the refractive optical element and a power arrangement in the sub-scanning cross-section of an off-axis of the refractive optical element, in an optical axis direction.

2. An apparatus according to claim 1, wherein the diffraction optical element has at least one of an incident surface having a convex shape in a sub-scanning cross-section facing the deflection means and an exit surface having a convex shape in the sub-scanning cross-section facing the surface to be scanned.

3. An apparatus according to claim 1, wherein a plurality of light beams are emitted from the light source means.

4. An apparatus according to claim 1, wherein the refractive optical element has a meniscus shape in a main scanning cross-section such that a concave surface faces the deflection means.

5. An image forming apparatus comprising:

a scanning optical apparatus according to claim 1;

a photosensitive member arranged on the surface to be scanned;

a developing member for developing an electrostatic latent image formed on said photosensitive member by the light beam scanned by said scanning optical apparatus as a toner image;

a transfer member for transferring the developed toner image onto a material to be transferred;

a fixing member for fixing the transferred toner image on the material to be transferred; and a printer controller for converting code data inputted from an external device into an image signal and inputs the image signal into said scanning optical apparatus.

6. An image forming apparatus comprising:

a plurality of scanning optical apparatuses according to claim 1, wherein a color image is formed by guiding a plurality of light beams emitted from the respective scanning optical apparatuses onto a plurality of corresponding image bearing member surfaces, respectively, and scanning the plurality of image bearing member surfaces with the plurality of light beams.

7. An apparatus according to claim 1, wherein the following condition is satisfied:

$$0.5 < |e2/s1| < 1.2$$

where e2 represents a distance between an exit surface of the refractive optical element on an optical axis and an incident surface of the diffraction optical element on the optical axis, and s1 represents a distance between the incident surface of the diffraction optical element on the optical axis and a front focus position of the diffraction optical element in a sub-scanning cross-section.

8. An apparatus according to claim 7, wherein the following condition is satisfied:

$$0.55 < |e2/s1| < 1.1.$$

* * * * *

UNITED STATES PATENT AND TRADEMARK OFFICE
CERTIFICATE OF CORRECTION

PATENT NO. : 6,677,972 B2
DATED : January 13, 2004
INVENTOR(S) : Kazumi Kimura

It is certified that error appears in the above-identified patent and that said Letters Patent is hereby corrected as shown below:

Column 5,
Line 66, "aspects" (first occurrence), should be deleted.

Column 11,
Line 26, "x1of" should read -- x1 of --.

Column 13,
Line 60, "gives indicates" should read -- gives --.

Column 15,
Line 41, "3.395E-08" should read -- 3.395E-07 --.

Column 17,
Line 27, "2.500E+01" should read -- 2.500E+02 --.

Signed and Sealed this

Third Day of August, 2004

JON W. DUDAS
*Acting Director of the United States Patent and Trademark Office*